(12) United States Patent
Kuhn et al.

(10) Patent No.: US 6,789,569 B2
(45) Date of Patent: Sep. 14, 2004

(54) PRESSURE RELIEF VALVE WITH A SPRING-LOADED MEMBRANE CLOSING BODY

(75) Inventors: Peter Kuhn, Weinheim (DE); Frank Obrist, Dornbirn (AT); Stefan Kroess, Dornbirn (AT); Georg Weber, Offenbach (DE)

(73) Assignees: Obrist Engineering GmbH, Lustenau (AT); Luk Fahrzeug-Hydraulik GmbH & Co. KG, Bad Homburg (DE)

( * ) Notice: Subject to any disclaimer, the term of this patent is extended or adjusted under 35 U.S.C. 154(b) by 40 days.

(21) Appl. No.: 10/181,645
(22) PCT Filed: Nov. 13, 2001
(86) PCT No.: PCT/IB01/02158
§ 371 (c)(1), (2), (4) Date: Jul. 18, 2002
(87) PCT Pub. No.: WO02/42668
PCT Pub. Date: May 30, 2002

(65) Prior Publication Data
US 2003/0000583 A1 Jan. 2, 2003

(30) Foreign Application Priority Data
Nov. 24, 2000 (DE) .......................................... 100 58 515
(51) Int. Cl.[7] .............................................. F16K 17/04
(52) U.S. Cl. ...................... 137/536; 137/540; 137/510; 251/61.1; 251/331
(58) Field of Search ................................ 137/510, 528, 137/535, 536, 540, 494, 496; 251/61.1, 61.2, 61.5, 331; 92/96, 98 R

(56) References Cited

U.S. PATENT DOCUMENTS

| | | | |
|---|---|---|---|
| 1,496,935 A | * 6/1924 | Lemmon | 137/494 |
| 4,243,070 A | * 1/1981 | Jackson | 137/510 |
| 4,420,015 A | 12/1983 | Blaser | 137/852 |
| 5,413,311 A | 5/1995 | Arstein et al. | 251/331 |
| 5,944,050 A | 8/1999 | Walker | 137/510 |

FOREIGN PATENT DOCUMENTS

| | | |
|---|---|---|
| DE | 1 095 074 | 12/1960 |
| FR | 2 677 425 | 12/1992 |

* cited by examiner

Primary Examiner—Ramesh Krishnamurthy
(74) Attorney, Agent, or Firm—Ladas & Parry

(57) ABSTRACT

The pressure relief valve has a spring pressure-loaded diaphragm closing body (13), which in the closed position sealingly engages on a centrally positioned valve seating surface (10) surrounding a first valve opening (8). Its spring pressure loading takes place by means of a counterpressure body (13) positioned centrally over it. The valve seating surface (10) is surrounded by a channel-like valve chamber (11) in the valve housing body (2) and on which is provided on the overpressure side at least one second valve opening (9). To be able to dissipate high overpressures, the counterpressure body (30) is surrounded by a diaphragm support ring (17) held on the valve housing (6) and which has a circumferential recess (19), whose depth measured perpendicular to the diaphragm closing body (13) determines the maximum deflection of said body (13), so that when the valve is completely opened the diaphragm closing body (13) is supported in an area between the valve seating surface (10) and its outer edge.

20 Claims, 5 Drawing Sheets

PRESSURE RELIEF VALVE WITH A SPRING-LOADED MEMBRANE CLOSING BODY

FIELD OF THE INVENTION

The invention relates to a pressure relief valve with a spring pressure-loaded diaphragm closing body, which in the closed position sealingly engages on a centrally positioned valve seating surface surrounding a first valve opening and whose spring pressure loading determining the sealing pressure takes place by means of a counterpressure body centrally arranged in the vicinity of and over the valve seating surface, which is surrounded by a channel-like valve chamber covered by the diaphragm closing body and provided in the valve housing body and on which on the overpressure side is provided at least one second valve opening.

DESCRIPTION Of THE RELATED ART

A pressure relief valve of this type is known from U.S. Pat. No. 5,944,050. This valve is only suitable for relatively low pressures as a result of the nature of the arrangement or mounting of the diaphragm closing body. It also takes up a relatively large construction volume with a correspondingly high thermal inertia, which has a disadvantageous effect e.g. when used in $CO_2$ air conditioning systems.

U.S. Pat. No. 5,413,311 discloses a diaphragm valve, whose counterpressure body operated by a closing piston is surrounded by a ring, which engages on the diaphragm closing body, both in the closed and the opened valve position and by means of which said diaphragm closing body is fixed in the vicinity of its outer circumference. It also forms a stop for the maximum lifting motion of the counterpressure body. Said stop is positioned in such a way that with the valve opened to the maximum the diaphragm closing body has a planar configuration. Consequently when engaged on the valve seating surface it is downwardly outwardly curved in its central area.

FR-A-26 77 425 discloses a diaphragm closing valve, which is intended to have a maximum opening cross-section. For this purpose in the relieved state, the diaphragm closing body is upwardly and outwardly curved away from the plane of its peripheral fixing in plate-like or step-like manner. For closing purposes it is deformed by a closing piston counter to its spring tension in the direction of the valve seating surface. A downward displacement of the valve seating surface away from the fixing plane of the diaphragm closing member increases the spring elastic deformation of the diaphragm closing body necessary for closing purposes. A ring surrounding the closing piston serves both to fix the diaphragm edge and as a boundary casing for the diaphragm closing body, when the latter has its plate-like starting shape in the relieved state with the closing piston raised.

SUMMARY OF THE INVENTION

The problem of the invention is to provide a pressure relief valve of the aforementioned type which, in the case of an adequately large opening cross-section and without overloading its diaphragm closing body, is suitable for pressure differences of more than 150 bar between its inflow and outflow sides. According to a preferred embodiment it has a low thermal inertia due to its particularly compact construction and despite the relatively large flow cross-section, so that it can be used with advantage, particularly in areas with pronounced temperature changes, such as e.g. during the cooling and heating operation of a $CO_2$ air conditioning system.

According to the invention the problem is solved in that the counterpressure body placed over the valve seating surface or a counterpressure plate cooperating therewith is surrounded by a diaphragm support ring held on the valve housing and which extends radially outwards from the counterpressure body over the valve chamber to the outer edge of the diaphragm closing body and above the valve chamber has a circumferential recess, whose depth measured perpendicular to the diaphragm closing body determines the maximum deflection of the diaphragm closing body, so that when the valve is completely opened the diaphragm closing body is supported in an area between the valve seating surface and its outer edge.

Embodiments of the invention are described hereinafter relative to the attached drawings, wherein show:

DETAILED DESCRIPTION OF THE INVENTION

Figure 1:
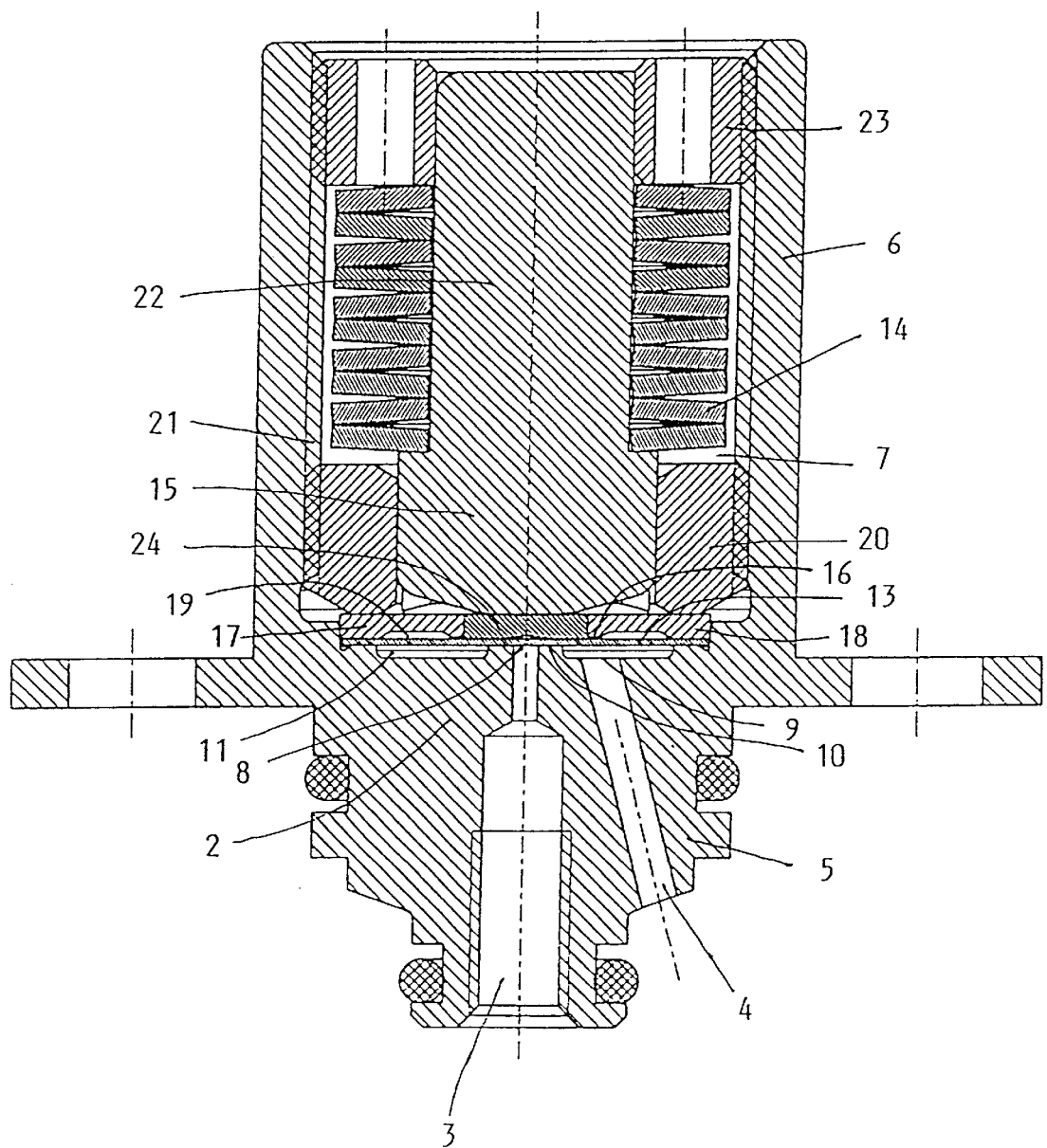
FIG. 1 A not true-to-scale cross-section through a pressure relief valve in the closed position.

The pressure relief valve 1, which is particularly suitable for the high pressures of a $CO_2$ air conditioning system, preferably has a one-piece, compact housing body 2 with a base part 5 enclosing the connecting grooves 3, 4 and a cylindrical housing wall 6 connected thereto and which forms a cup-shaped housing area 7, into whose bottom issue a first and a second valve openings 8 and 9 of the connecting grooves 3 and 4. The valve seating surface 10 surrounding the first valve opening 8 is outwardly surrounded by a flat valve chamber 11 shaped in channel-like manner into said bottom and which extends outwards to a clamp fit surface 12, which is intended for retaining and sealing the circumferential area of a diaphragm closing body 13.

The diaphragm closing body 13 is formed by at least one planar, preferably metallic diaphragm, which in the closed position rests on a planar valve seating surface 10 and is maintained there in the closed position by a counterpressure body 15 transferring the closing force of at least one spring element 14. As a result of the planar-surface sealing contact between the preferably finely ground valve seating surface 10 and the metallic diaphragm of the closing body 13, associated with the pressure acting in this area through the counterpressure body 15, a sealing effect counteracting high pressures and thermal stresses is obtained.

Figure 4:
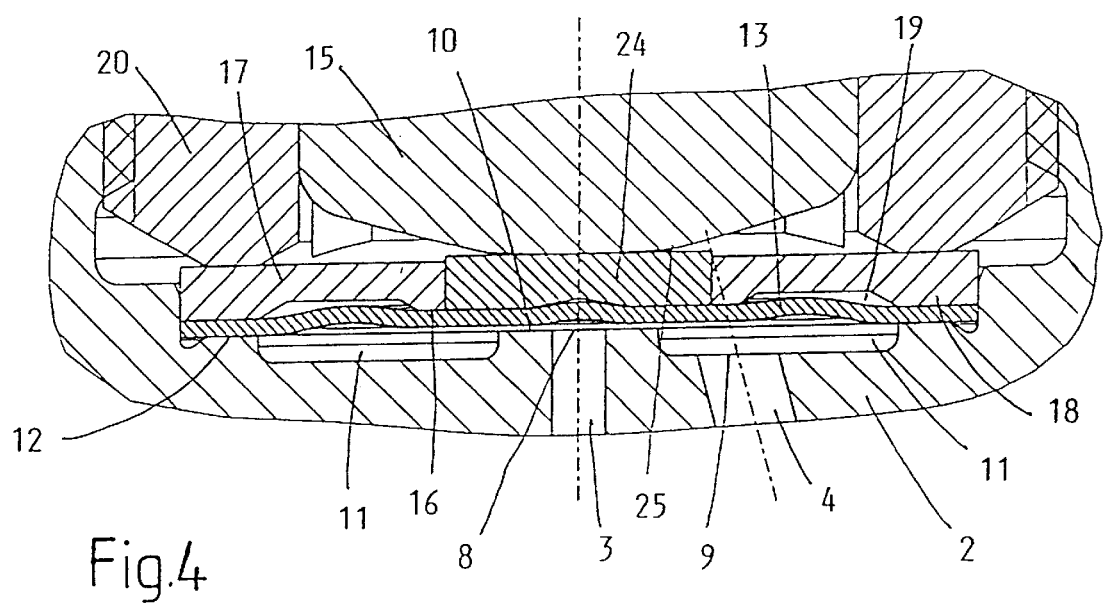
FIG. 4 A representation corresponding to FIG. 3 with a diaphragm closing body, which is curved out and raised from the valve seat.

In order to be able to absorb the force suddenly acting on the entire free diaphragm surface and prevent an excessive deformation of the diaphragm closing body 13 at the time of the opening of the valve under a high overpressure and a corresponding falling back of the counterpressure body 15, said body 13 is supported by the support edge 16 of a flat support ring 17 above the channel-like, circumferential valve chamber 11 and opposite the second valve opening 9 in a radially closely defined area. When the valve is closed, said support edge 16 is spaced from the diaphragm closing body 13, so that it only becomes active during the opening movement thereof. It allows the multiple curvature of the diaphragm closing body in its position raised from the valve seating surface 10 preventing local overstressing and illustrated in FIG. 4.

Figure 3:
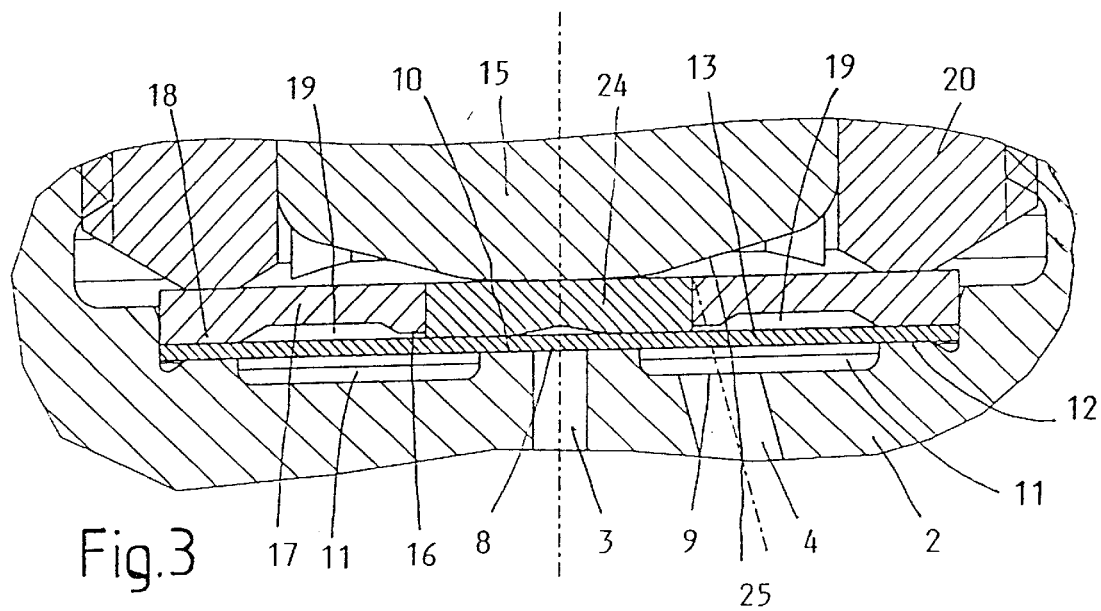
FIG. 3 A larger scale detail of the cross-sectional representation of FIG. 1 in the vicinity of the diaphragm closing body when closed.

With an outer, flat clamping edge 18, the support ring 17 also serves as a clamping ring for retaining the edge of the diaphragm closing body 13. Between its clamping edge 18 and its support edge 16, the support ring 17 consequently has a recess 19 defining said edges 16, 18. Starting from the position according to FIG. 3, the closing body diaphragm 13 can deform into the recess 19, as illustrated by the larger scale representation of the opened valve in FIG. 4.

For the sealing pressing of the support ring 17 with its clamping edge 18 against the diaphragm edge there is a screw ring 20 having an external thread and which engages with an internal thread 21 on the housing wall 6.

The spring pressure loading of the diaphragm closing body 13 via the counterpressure body 15 takes place both as a result of its spring characteristic and as a result of the limited installation height thereof, preferably through disk springs 14 which, in the embodiment according to FIG. 1, surround the shaft 22 of the counterpressure body 15 and are fixed between a step of the counterpressure body 15 and a threaded ring 23 screwed into the housing area 7.

The transfer of the spring tension from the spring-loaded counterpressure body 15 to the diaphragm closing body 13 preferably takes place by means of a counterpressure plate 24 engaging on the diaphragm closing body 13. For a uniform pressing of the diaphragm closing body 13 against the valve seating surface 10 contact between the counterpressure plate 24 and the counterpressure body 15 takes place by means of a curved surface provided on at least one of the two and whose centre of curvature is in the axis of the first valve opening 8. In the embodiment of FIG. 1, there is a spherically curved end face 25 of the counterpressure body 15 in pressure-transferring contact with a planar counterpressure plate 24 engaging on the diaphragm closing body 13. However, in the embodiments of FIGS. 5 and 6 a counterpressure member 34 guided in the support ring 33 is provided at its upper end with a convex, circular symmetrical curvature 35, which is received in a correspondingly curved, concave recess.

Figure 2:
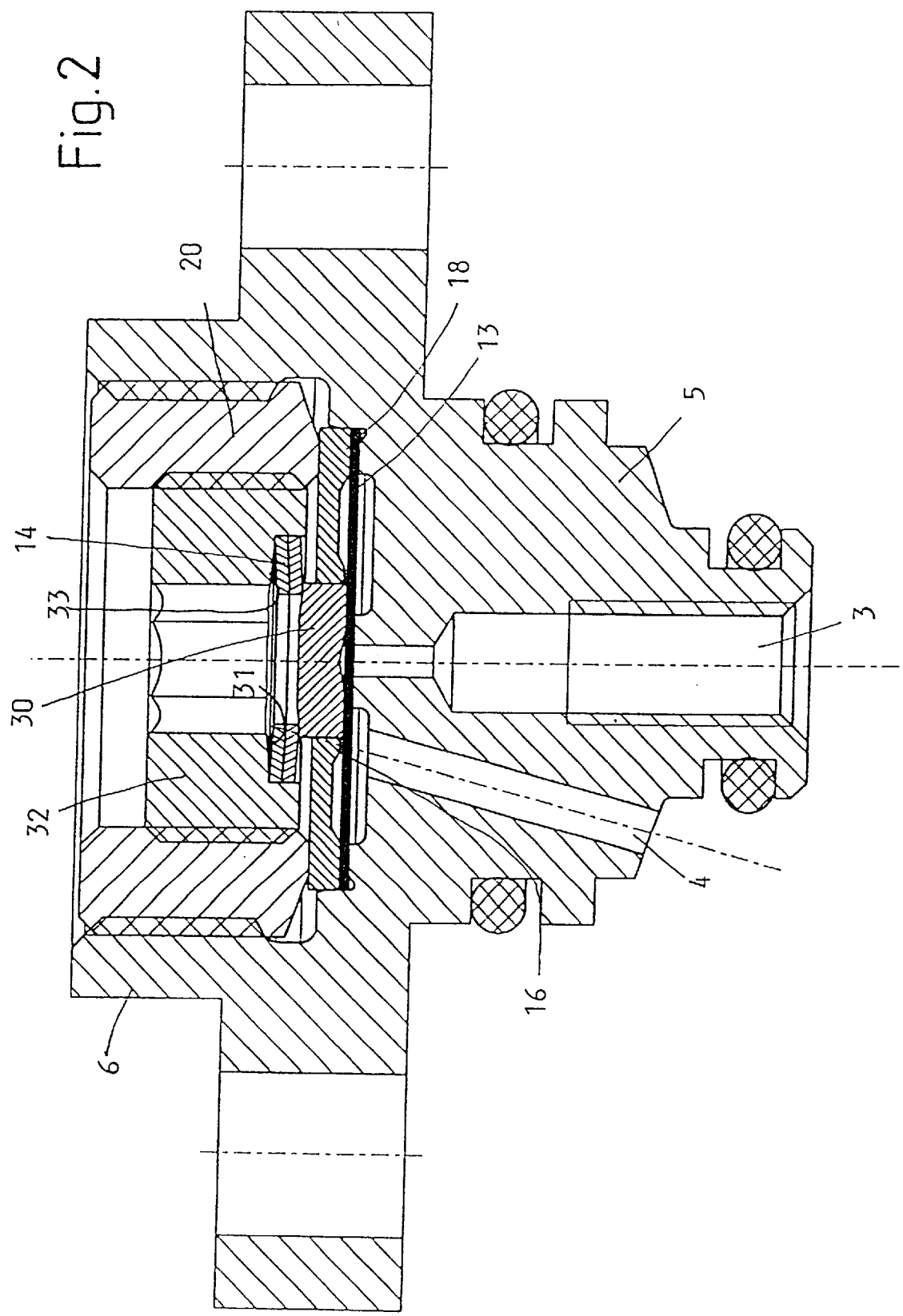
FIG. 2 A second embodiment of a pressure relief valve according to the invention in cross-section.

In the embodiment of FIG. 2 the counterpressure body 30 only comprises a counterpressure plate 30 and two equidirectionally arranged disk springs 14 are located in a recess 31 of a screw body 32 determining the spring pretension. The substantially radially directed inner surface 33 of the recess 31 is inclined away from the disk springs 14, so that the latter can spring from the position corresponding to the valve closing position away from the counterpressure body 30. The pressure action of the counterpressure body takes place by means of the inner edge of the disk springs 14 engaging thereon. The screw body 32 tensioning the disk springs 14 is screwed into the screw ring 20 holding the support ring 17 in order to limit the valve height. The minimum height of the counterpressure member 30 projecting only slightly over the support ring 17 contributes to the flat construction of the valve according to FIG. 2.

Figure 5:
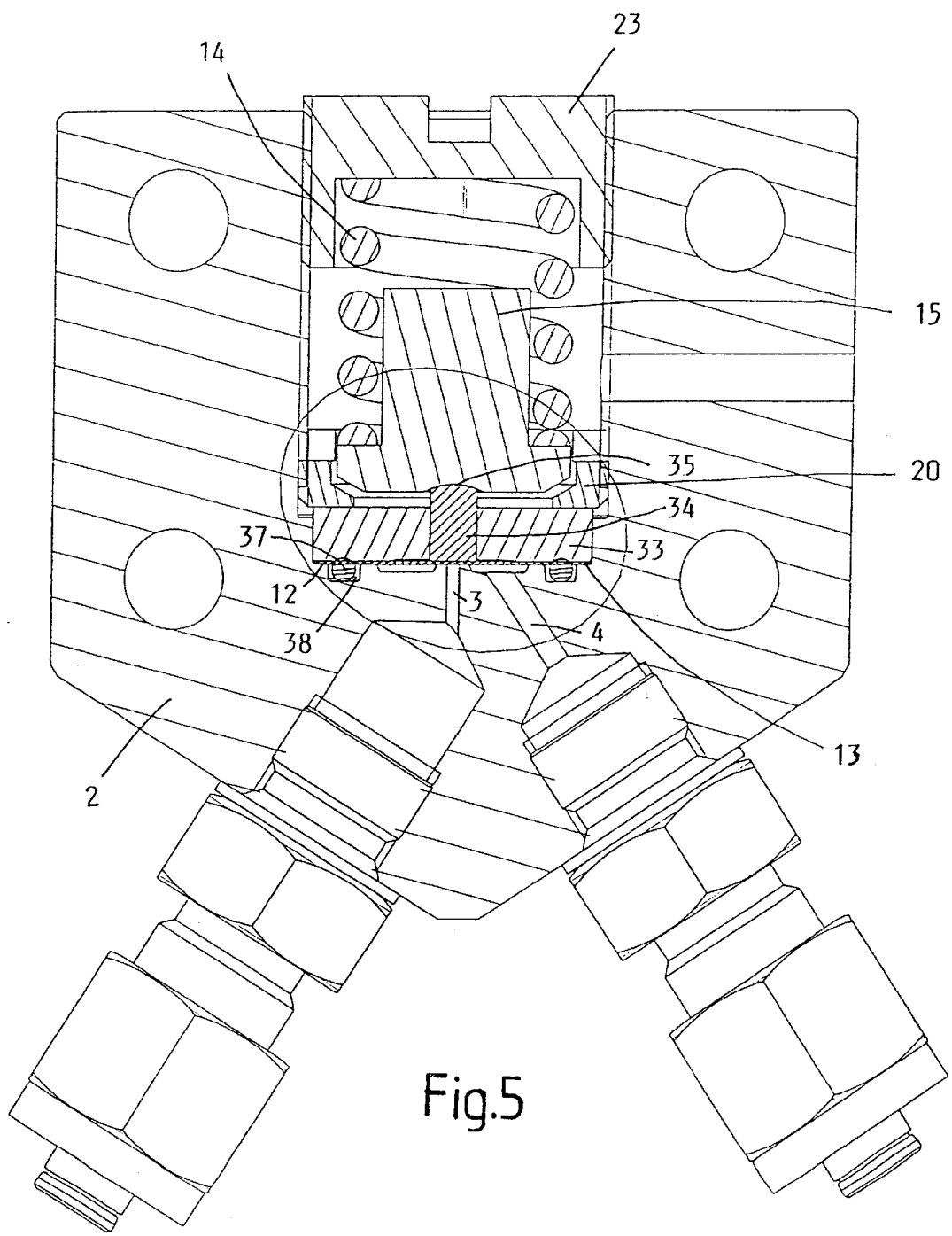
FIG. 5 A third embodiment of a pressure relief valve according to the invention in a larger scale cross-sectional representation.
Figure 6:
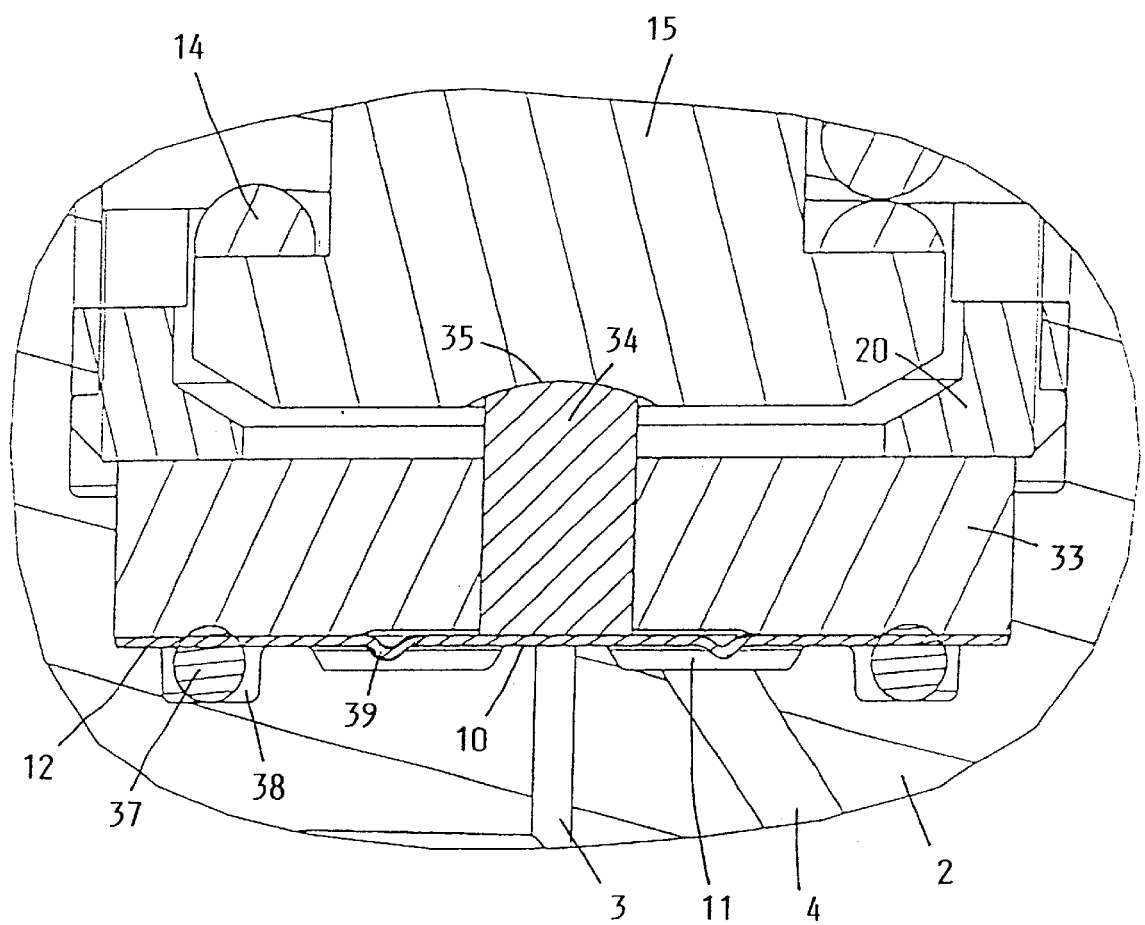
FIG. 6 A fourth embodiment of a pressure relief valve according to the invention in a larger scale partial cross-section.

FIGS. 5 and 6 show pressure relief valves according to the invention with measures to avoid tensile stresses in the diaphragm closing body 13 as a result of an inflexible clamping fit on the clamping edge 18 and which leads to a change in the valve response pressure. Such stresses arise because the diaphragm closing body 13 is extracted somewhat from its clamping fit on the clamping edge 18 through its bending out during the first valve opening and due to the frictional forces in the clamping fit cannot completely slide back during the following closing.

In accordance with a first measure for avoiding tensile stresses in the diaphragm closing body and in accordance with FIGS. 5 and 6, in the vicinity of the outer diaphragm circumference or the clamping fit surface 18 is provided an elastic sealing ring 37 e.g. in the form of an O-ring and which is enclosed in a circumferential slot 38 of the housing body 2 and which engages under pretension on the diaphragm closing body. Such a sealing of the diaphragm closing body makes it possible to considerably reduce the clamping force on the clamping edge 18, so that on opening and closing the valve the diaphragm closing body 13 can perform an adequate sliding movement in the area of its marginal seal to prevent permanent tensile stresses.

As a second, e.g. additional measure for avoiding tensile stresses in the diaphragm closing body, in the embodiment according to FIG. 6 in the latter is provided a circularly circumferential, channel-like bulge 39. The valve chamber 11 passing beneath the diaphragm closing body 13 provides a free space for the positioning of such a bulge 39. In place of a channel-like bulge 39, the diaphragm closing body 13 can have a circumferential step in a not shown manner. However, such a step in the diaphragm closing body 13 would prevent the placing of the peripheral clamping fit surface 12 in the same plane as the valve seating surface 10. Such circumferential bulges 39 or steps are able to elastically absorb the tensile force resulting from the opening movement of the diaphragm closing body 13 and arising in the plane thereof, so that an extraction of the diaphragm closing body 13 from its peripheral clamping fit on the clamping fit surface 12 is prevented.

What is claimed is:

1. Pressure relief valve with a spring pressure-loaded diaphragm closing body, which in the closed position sealingly engages on a centrally positioned valve seating surface surrounding a first valve opening and whose spring pressure loading determining the sealing pressure takes place by means of a counterpressure body centrally arranged in the vicinity of and over the valve seating surface, which is surrounded by a channel-like valve chamber covered by the diaphragm closing body and provided in the valve housing body and on which on the overpressure side is provided at least one second valve opening, characterized in that the counterpressure body placed over the valve seating surface or a counterpressure plate cooperating therewith is surrounded by a diaphragm support ring held on the valve housing and which extends radially outwards from the counterpressure body over the valve chamber to the outer edge of the diaphragm closing body and above the valve chamber has a circumferential recess, whose depth measured perpendicular to the diaphragm closing body determines the maximum deflection of the diaphragm closing body, so that when the valve is completely opened the diaphragm closing body is supported in an area between the valve seating surface and its outer edge, wherein the recess is bounded radially inwards by a downwardly projecting support edge.

2. Pressure relief valve according to claim 1, characterized in that the diaphragm closing body is relieved in the closed position and planar and the valve seating surface extends parallel to the diaphragm closing body in the closed position.

3. Pressure relief valve according to claim 1, characterized in that a counterpressure plate is located between the counterpressure body and the diaphragm closing body and the contact between the counterpressure plate and the counterpressure body takes place by means of a circular symmetrical, curved surface provided on at least one of these and whose centre of curvature is in the axis of the first valve opening.

4. Pressure relief valve according to claim 1, characterized in that on its outer circumference the support ring has a clamping edge for the sealing, clamping retention of the diaphragm closing body on a circumferential surface of the housing body, the support ring being kept under pretension by a tensioning element acting towards a clamping fit surface.

5. Pressure relief valve according to claim 1, characterized in that the valve chamber is radially outwardly sealed by a sealing ring, engaging on the diaphragm closing body and located in a circumferential slot of the housing body, so that during the opening or closing movement of the diaphragm closing body the latter performs a compensating movement in its plane in the area of its marginal seal.

6. Pressure relief valve according to claim 1, characterized in that in the vicinity of the valve chamber, the diaphragm closing body has at least one channel-like, circumferential bulge or a step.

7. Pressure relief valve according to claim 1, characterized in that the spring pressure loading of the counterpressure body is provided by at least one disk spring.

8. Pressure relief valve according to claim 7, characterized in that there are one or two equidirectionally engaging disk springs, whose surface is inclined towards the first valve opening with the valve closed.

9. Pressure relief valve according to claim 7, characterized in that the counterpressure body is in the form of a plate enclosed in the support ring.

10. Pressure relief valve according to claim 7, characterized in that the disk springs are located in a recess of a screw body determining the spring pretension.

11. Pressure relief valve according to claim 10, characterized in that the screw body tensioning the disk springs is screwed into the screw ring retaining the support ring.

12. Pressure relief valve with a spring pressure-loaded diaphragm closing body, which in the closed position sealingly engages on a centrally positioned valve seating surface surrounding a first valve opening and whose spring pressure loading determining the sealing pressure takes place by means of a counterpressure body centrally arranged in the vicinity of and over the valve seating surface, which is surrounded by a channel-like valve chamber covered by the diaphragm closing body and provided in the valve housing body and on which on the overpressure side is provided at least one second valve opening, characterized in that the counterpressure body placed over the valve seating surface or a counterpressure plate cooperating therewith is surrounded by a diaphragm support ring held on the valve housing and which extends radially outwards from the counterpressure body over the valve chamber to the outer edge of the diaphragm closing body and above the valve chamber has a circumferential recess, whose depth measured perpendicular to the diaphragm closing body determines the maximum deflection of the diaphragm closing body, so that when the valve is completely opened the diaphragm closing body is supported in an area between the valve seating surface and its outer edge, wherein the diaphragm closing body is relieved in the closed position and planar and the valve seating surface extends parallel to the diaphragm closing body in the closed position.

13. Pressure relief valve according to claim 12, wherein the recess is bounded radially inwards by a downwardly projecting support edge.

14. Pressure relief valve according to claim 12, wherein a counterpressure plate is located between the counterpressure body and the diaphragm closing body and the contact between the counterpressure plate and the counterpressure body takes place by means of a circular symmetrical, curved surface provided on at least one of these and whose centre of curvature is in the axis of the first valve opening.

15. Pressure relief valve according to claim 12, wherein the valve chamber is radially outwardly sealed by a sealing ring, engaging on the diaphragm closing body and located in a circumferential slot of the housing body, so that during the opening or closing movement of the diaphragm closing body the latter performs a compensating movement in its plane in the area of its marginal seal.

16. Pressure relief valve with a spring pressure-loaded diaphragm closing body, which in the closed position sealingly engages on a centrally positioned valve seating surface surrounding a first valve opening and whose spring pressure loading determining the sealing pressure takes place by means of a counterpressure body centrally arranged in the vicinity of and over the valve seating surface, which is surrounded by a channel-like valve chamber covered by the diaphragm closing body and provided in the valve housing body and on which on the overpressure side is provided at least one second valve opening, characterized in that the counterpressure body placed over the valve seating surface or a counterpressure plate cooperating therewith is surrounded by a diaphragm support ring held on the valve housing and which extends radially outwards from the counterpressure body over the valve chamber to the outer edge of the diaphragm closing body and above the valve chamber has a circumferential recess, whose depth measured perpendicular to the diaphragm closing body determines the maximum deflection of the diaphragm closing body, so that when the valve is completely opened the diaphragm closing body is supported in an area between the valve seating surface and its outer edge, wherein the spring pressure loading of the counterpressure body is provided by at least one disk spring, and the counterpressure body is in the form of a plate enclosed in the support ring.

17. Pressure relief valve according to claim 16, wherein the recess is bounded radially inwards by a downwardly projecting support edge.

18. Pressure relief valve according to claim 16, wherein the diaphragm closing body is relieved in the closed position and planar and the valve seating surface extends parallel to the diaphragm closing body in the closed position.

19. Pressure relief valve according to claim 16, wherein the valve chamber is radially outwardly sealed by a sealing ring, engaging on the diaphragm closing body and located in a circumferential slot of the housing body, so that during the opening or closing movement of the diaphragm closing body the latter performs a compensating movement in its plane in the area of its marginal seal.

20. Pressure relief valve according to claim 16, characterized in that the screw body tensioning the disk springs is screwed into the screw ring retaining the support ring.

\* \* \* \* \*